United States Patent Office 3,410,502
Patented Nov. 12, 1968

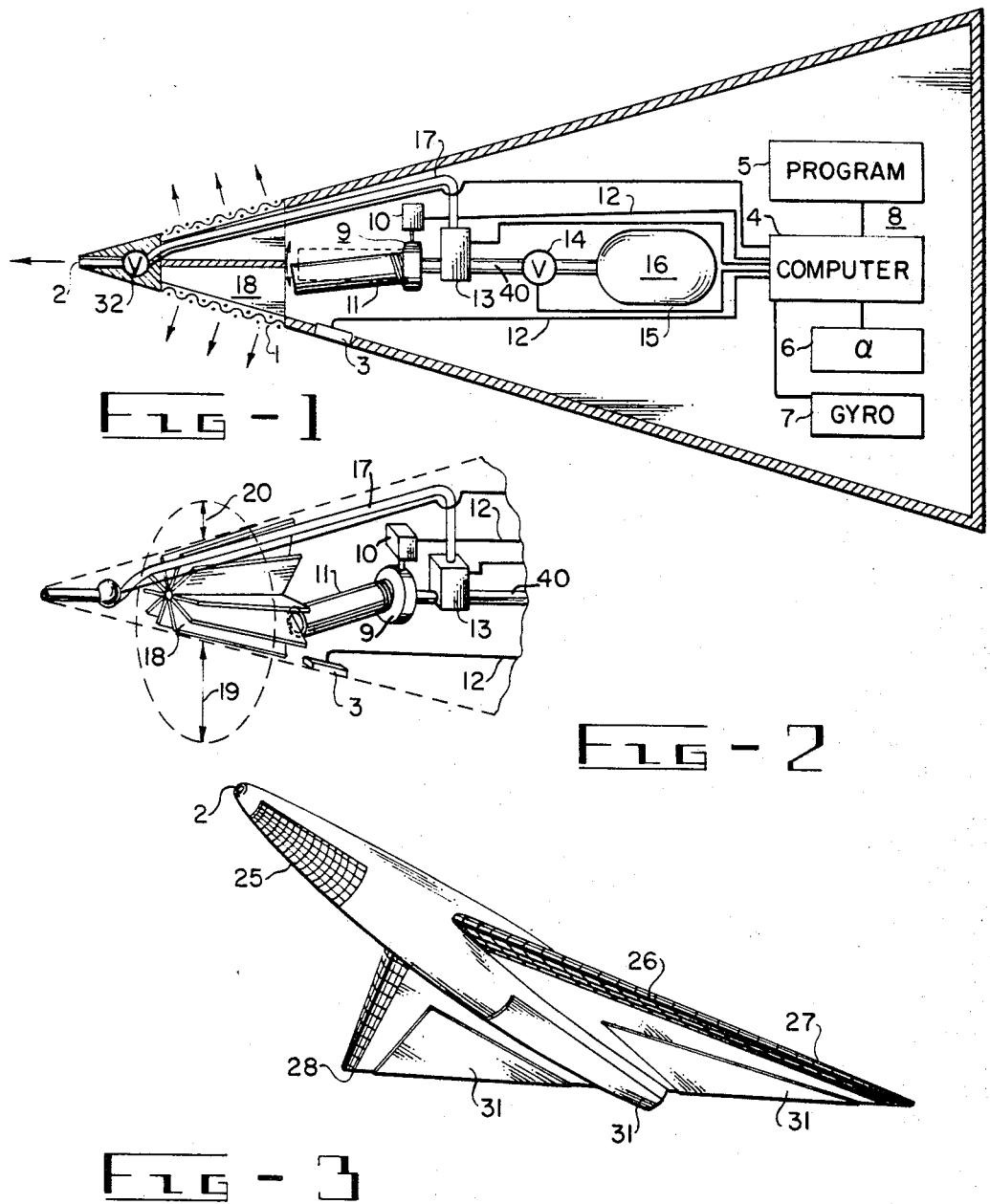

3,410,502
THERMAL ATTITUDE CONTROL DEVICE
Bernard M. Leadon, Gainesville, Fla., and Wilbert V. Carter, La Jolla, and William H. Gallaher, Lakeside, Calif., assignors to General Dynamics Corporation, San Diego, Calif., a corporation of Delaware
Filed Aug. 6, 1965, Ser. No. 477,817
10 Claims. (Cl. 244—1)

ABSTRACT OF THE DISCLOSURE

A cooling and attitude control device for hypersonic vehicles having an internal source of high pressure coolant and control fluid which is distributed to a nose cooling orifice and to selected ones of a plurality of porous control orifices spaced about the nose portion of the vehicle. The valve controlling the distribution can produce a pitch or yaw correction despite vehicle roll and can distribute additional fluid for supplemental cooling.

---

The hypersonic vehicle may be a manned or unmanned spacecraft, missile or nose cone.

The system can be applied during the boost phase, re-entry or during any other flight condition either within or without the atmosphere.

The system can be used in combination with other means of control for providing cooling primarily and dominate the control when the other means of control becomes ineffective.

The device described in this invention disclosure can be applied to lifting or non-lifting, random-roll hypersonic vehicles which are traveling at hypersonic velocities within earth's atmosphere (or other planetary atmosphere) where external temperatures exceed the allowable temperatures for the vehicle structure or where only attitude control is desired. The present invention could be applied in the boost, cruise or re-entry phase where these high temperatures occur. This device can cool or allow attitude control of a random-roll vehicle by using localized coolant ejection in an unique manner. For instance, a permeable structure as disclosed in Patent No. 2,941,759, by R. C. Rice et al., can be used for the ejection of coolant fluids. The coolant is ejected near the apex or nose of the vehicle and always out the windward side, if desired, even though the vehicle is rolling. The amount of coolant that is ejected on the windward side can be increased to provide the required force to change the attitude for a maneuverable vehicle or to maintain a desired attitude for a constant L/D vehicle, or constant angle-of-attack (or angle-of-yaw) vehicle. This type of ejection can increase the L/D magnitude at a given yaw angle, in addition to effecting trim at the necessary yaw angle.

The necessary yaw angle may be zero in which case L/D would be zero. Thus, the system would hold the vehicle accurately on its intended trajectory. For this purpose the inertial injection control system to be described in detail below would always act counter to the pitch of the vehicle, stabilizing its trajectory by opposing any positive yaw rate. At a certain time, or upon command, the sense of the inertial control could be reversed to allow destabilization toward a particular yaw angle and in any chosen inertial plane. This would turn the nose about the center of gravity, and deflect the vehicle from its trajectory, in that inertial plane, despite the fact that the vehicle might be rolling simultaneously about its longitudinal axis.

It is desirable to have a slender-nosed vehicle for high speed or for maneuverability or for both, however, the prior art provides vehicles where the desired slender nose is often of ablative material. When the ablative material erodes away to provide cooling, the configuration of the vehicle or cone is changed from an aerodynamic standpoint and the desired configuration is changed for further flight.

Therefore, a part of this system is provision to eject coolant fluid from the very tip of the sharp nose to the extent necessary to keep that tip intact. Experiments have been performed providing that this is entirely feasible to do with a limited coolant supply. This is true despite the fact that the heating rate at the stagnation point increases with decreasing (spherical) nose radius because the area to be cooled in the vicinity of the stagnation point diminishes with the radius squared. Therefore, if the fractional heating rate reduction is approximately linear with coolant rate, less and less coolant is required to cool the very tip of the cone as its (spherical) tip radius is reduced.

For very slender tips it is possible to use materials having very high melting points such as refractories and the so-called cermets. Then the surface temperatures are allowed to rise to the point where outward radiation is sufficient to overcome the aerodynamic heat flux to the surface. Such tip construction is also compatible with the disclosed design.

Thus a spacecraft with a low-drag nose design, used for re-entry and maneuvering in combination with the extreme high temperatures, which permanently keeps its low-drag design has not been known in the prior art thus far, however, is made feasible by the present invention disclosed and described hereinafter.

It is therefore an object of the present invention to provide a cooling device which maintains a permanent low-drag or sharp pointed nose configuration on a hypersonic vehicle.

It is an additional object of the present invention to provide a cooling method wherein a coolant can be selected which will reduce the radar cross-section and optical radiance of the wake of a mass-transfer cooled low-drag vehicle.

It is another object of the invention to provide a cooling method which can be regulated for attitude control and wherein the static trim angle of the vehicle can be controlled by blowing unsymmetrically and as a result produce a useful side load for maneuvering or for producing a desired constant L/D.

It is another object of the present invention to provide a thermo-attitude control device which insures greater stability limits on a vehicle which will have large shifts in center of pressure from hypersonic to subsonic velocities.

It is an important object of the present invention to provide a thermal attitude control device which has a high sensitivity to attitude control of the vehicle so that rapid changes in trajectories can be obtained.

It is another important object of the present invention to provide a thermal attitude control device which is capable of over a hundred "g's" change in trajectory for re-entry nose cones in a few seconds.

It is still an additional object of the present disclosed invention to provide a method for changing the orbit of a satellite by effecting a partial descent and using aerodynamic forces to return to a new orbit.

Furthermore, this invention provides other objects, features, and advantages which will become fully apparent from the following detailed description taken in conjunction with the accompanying drawings which illustrate and clarify the preferred embodiments and in which, FIGURE 1 is a cross-section of a low-drag hypersonic vehicle or capsule entering atmosphere at a certain angle of attack.

FIGURE 2 is taken from the nose section of FIGURE 1 and which illustrates in a perspective fashion the arrangement of the several compartments in the permeable nose cone structure as well as showing proportionally the amount of fluid ejected about the periphery of the permeable nose structure.

FIGURE 3 is a perspective view of a manned vehicle operating at hypersonic and supersonic speeds and is of a hybrid type by its combination of thermal constructions encompassing ejection cooling and ablation or radiation thermal protection.

In general the present invention provides a thermal attitude control system for hypersonic vehicles having a low-drag nose configuration.

A first means is provided at the apex of the vehicle's nose for ejecting a coolant fluid for maintaining the low-drag nose configuration.

A second means is disposed about the nose periphery for ejecting coolant fluid for cooling of the downward structure and for attitude control.

A control means having a computer, a programmer, an angle of attack sensor and a gyro means; is connected with a control direction means which controls the pressure and amount of fluid to be ejected through the first and second coolant ejecting means and also directs quantity of fluid at desired location through said second coolant ejecting means.

Referring now to FIGURE 1, there is shown a spacecraft provided with a low-drag nose configuration. The nose section has a permeable structure 1 and the apex of the nose is provided with an orifice or aperture 2. At various points about the periphery of the nose section temperature sensing means 3 are located (only one shown for illustrative purposes). A computer 4 is connected electrically with the temperature sensing means 3. A programmer means 5, angle of attack sensing means 6 and gyro means 7 are also connected to computer 4. The computer 4, programmer 5, angle of attack 6 and gyro means 7 form the control means 8 in combination with the control direction means 9. The control direction means 9 comprises an actuator means 10 and a swivel nozzle 11. The nozzle 11 is connected to a regulator valve 13 and a pressure step-down valve 14 with a tank 15 filled with a coolant fluid 16. Conduit means 17 connects the aperture 2 with the regulator 13 and conduit 40 connects the regulato 13 with valve 14 and tank 15. The regulator 13 is controlled by the control system 8 through electrical circuit means 12. The permeable structure 1 comprises a skin which is of a porous wall construction for the ejection of the coolant fluid 16 out of the vehicle. FIGURE 2 is a perspective section of the nose section of FIGURE 1, and illustrates the permeable structure 1 having a plurality of compartments 18. As schematically illustrated in FIGURE 2, the nozzle 11 is positioned off center by the actuator 10 so that the amount of ejected coolant fluid about the periphery of the nose section is different. For example, at a certain angle of attack, the amount of ejected fluid 19 will be larger than the amount of ejected fluid 20 shown in the schematic illustration of FIGURE 2.

In FIGURE 3, is shown a vehicle which is designed to operate at a constant angle of attack, such as required for high $L/D$ vehicles, the permeable structure 25 in the nose section is shown to be located on the windward streamline of the vehicle only and further permeable structural means 26 are provided at the leading edge 27 and part of the bottom portion of the wingedge 28. This hybrid vehicle employs control means and control direction means (not shown) similar to that shown in FIGURES 1 and 2. The control direction means distributes coolant fluid selectively to the permeable structure means 25 and 26. Coolant fluid exhausting through means 25 produces changes in the pitch attitude of the vehicle. Coolant to the means 26 may be directed in greater proportion to one leading edge or the other to produce changes in the roll attitude or excess coolant may be directed to both surfaces to supplement cooling from ablative or radiation cooling sections 31.

The thermal-attitude control device for low-drag vehicle configuration can be applied to the following types of vehicles: (a) vehicles designed to change or vary their angle-of-attack during re-entry such as a random-roll maneuverable entry vehicle, illustrated in FIGURE 1, and (b) vehicles designed to operate at a constant angle-of-attack, such as required for a high $L/D$ random roll vehicle as shown in FIGURE 3.

The desired attitude or variable attitude control is achieved in the following basic unique manner.

Assuming that the maximum allowed temperature for the exterior skin surface, sensed by temperature sensing means 3, has been reached, the computer 4 energizes opening of the valves 14 and 32 and controls the flow regulator 13 to maintain the exterior skin temperature at a level determined by the programmer 5.

Coolant fluid 16 is flowing from the apex 2 of the nose section at a very low rate, controlled by valve 32 or regulator 13, in order to cool its sharp pointed low-drag design and thus maintaining aerodynamic maneuverability.

Coolant fluid 16 is also flowing from the permeable structure 1 for maintaining exterior skin temperatures at predetermined levels controlled by the control system 8.

The angle-of-attack sensor 6 provides an input to the computer 4 which changes the coolant flow 16 so as to maintain a desired angle-of-attack while cooling the vehicle. The coolant flow change as mentioned is affected by the nozzle 11 activated by the actuator 10, resulting in more coolant flow to certain compartments 18 and less to other compartments, in the case of the vehicle in FIGURES 1 and 2, and more flow to selected ones of the permeable structural means 25 and 26 in the vehicle of FIGURE 3.

The inertial angle-of-attack could remain at a fixed predetermined value for the complete re-entry portion of the trajectory.

Basically, the system is controlled by computer 4 which commands and operates the regulator 13 and the valves 14 and 32 and directs the fluid coolant stream 16 through the permeable structure 1 by activating the control direction means 9. The computer compares the values of temperature from means 3 and attitude from the means 6 and 7, with the programmed values from programmer 5 and initiates commands to the control direction means and nose cooling means to bring the sensed values into correspondence with the programmed values.

A simpler manner for operating a random roll vehicle and its cooling system could be achieved by a counter balanced nozzle 11 which would provide inertial control to eject the coolant fluids in such a manner as to provide the necessary lift or cooling. The nozzle would be arranged as in FIGURES 1 and 2 with the exception that it would not be under the control of the computer 4 or actuator means 10. The nozzle would therefore be free to move within the constraints of its mounting under the action of vehicle or gravitational acceleration. Nozzle displacement for a given acceleration may be preset by the addition of supplemental weight to the end of the nozzle 11 if the nozzle weight itself is insufficient to produce the required displacement. During approach to a planetary body, for example, the earth, any deviation from a vertical attitude or zero angle of attack, will allow gravitational component to create a moment about the nozzle 11 pivot point, thereby deflecting the nozzle off center and directing a larger percentage of coolant fluid to that side of the vehicle. The direction of this coolant fluid discharge will remain constant despite changes in the roll attitude of the vehicle since the nozzle position with respect to the earth will not vary with vehicle rotation.

For a constant $L/D$ vehicle where it is desirable to maintain an angle-of-attack at the beginning of the re-entry, as shown in FIGURE 3, it may be desirable to program the control device prior to sensing the maximum temperature. Also the programmer could maneuver the vehicle prior to reaching the maximum temperature.

As mentioned in the objects of this invention a very important advantage of this system, being possible by its low-drag and permeable structure in combination with the directional ejection of coolant fluid, is to have sensitive and immediate maneuverability. Simulated tests have shown that with a high L/D low-drag vehicle configuration it is conceivable to have more than 200 G maneuverability in a three or four seconds time period.

FIGURE 3 shows a spacecraft with a wing having its leading edge and bottom portion of leading edge made of a permeable structure 26 and a permeable structure on the lower nose section 25. The vehicle is intended to fly at hypersonic speeds while landing at subsonic speeds. A high maneuverability will be maintained while at the same time temperature control is provided by the permeable structures and ablative material or radiation material structures 31. However, it should be noted that a great advantage is achieved by this unique combination, because the coolant fluid flow will affect the ablation construction areas 31 in such a way that a reduced amount of ablation material is required as in prior spacecraft applications thus saving a considerable amount of weight.

As is well known there are large shifts in center of pressure for vehicles flying from hypersonic to subsonic velocities. Stability in attitude control is therefore very important and it can be easily achieved by the controlled coolant fluid ejection from the permeable nose section. Thus a stability can be assured at hypersonic speeds for a vehicle that is designed for landing at subsonic speeds.

Furthermore, as heretofore mentioned as one of the objects of the invention, the coolant fluid which may be a gas or liquid depending on the particular configuration and desirabilities, may in some cases for military purposes reduce radar detection. A coolant can thus be selected which will reduce the radar cross-section and optical radiance of the wake of a mass transfer cooled low-drag vehicle. For instance, helium is considered a good gas, but it occupies considerable volume. Water is lower in volume but much heavier. If the invention is used with a weapon type nose cone then a gas which would provide reduced radar cross-section would be desirable. Where a sharp-nosed vehicle is used, the ionization which produces the radar image is in the boundary layer. Helium cools the boundary layer to a low temperature and reduces the ionization considerably.

In short, the present invention is a thermal-attitude control device for low-drag vehicles comprising cooling means to maintain its low-drag design in combination with means for additional cooling as well as attitude control thereby providing high immediate maneuverability and speed.

We claim:
1. The thermal-attitude control device for a spacecraft having a low-drag nose cone configuration, comprising in combination;
   (a) a first coolant ejecting means provided at the nose apex of said spacecraft,
   (b) a second coolant ejecting means disposed about said nose periphery, and
   (c) a control means including control direction means disposed in said spacecraft and adapted to regulate flow rate of coolant fluids through said first and second coolant ejecting means and capable of directing variable quantities of said coolant fluids at desired locations about said nose periphery through said second coolant ejecting means by said control direction means.

2. The thermal-attitude control device as claimed in claim 1 wherein said second coolant ejecting means comprises a permeable structure having means connected therewith for obtaining directional fluid flow.

3. The thermal-attitude control device as claimed in claim 1 wherein said second coolant ejecting means comprises a permeable structure having a plurality of compartments for obtaining directional coolant fluid flow and wherein said control direction means comprises a swivel nozzle and actuator for guiding said coolant fluids at several of said plurality of compartments as determined by said control means.

4. The thermal-atttiude control device as claimed in claim 1 wherein said control means comprises a computer means, a programmer means, an angle-of-attack sensor means and gyro means connected by electrical means with said control direction means.

5. The thermal-attitude control device as claimed in claim 4 wherein said computer means is connected by said electrical means with temperature sensing means disposed at said vehicle skin periphery.

6. A thermal-attitude control system for a spacecraft having a low-drag nose configuration, comprising in combination;
   (a) a first coolant ejecting means provided at the nose apex of said spacecraft,
   (b) a second coolant ejecting means disposed about said nose periphery of said spacecraft and comprising a permeable structure having a plurality of compartments wedged about the longitudinal axis of said spacecraft,
   (c) control means disposed in said spacecraft having electrical means connecting a computer means, angle-of-attack sensor means, gyro means, and a programmer means,
   (d) regulator valve means and control direction means connected with said computer means,
   (e) said control direction means having actuating means and swivelable nozzle means controlled by said actuating means, mounted adjacent said plurality of compartments and arranged for ejecting coolant fluid into said compartments as directed by data of said computer means, and
   (f) said computer means adapted to control and regulate the quantity of coolant fluid to be ejected by said first coolant ejecting means and said second coolant ejecting means by controlling said regulating valve means through said computer data.

7. The thermal-attitude control system as claimed in claim 6 wherein said computer means is connected with temperature skin sensing means disposed at said spacecraft's skin periphery and connected by said electrical means to said computer means for providing input data to said computer means.

8. The device as claimed in claim 6 wherein said valve regulating means comprises a first stepdown valve means for regulating the pressure and a second valve means for controlling the quantity of said coolant fluid through said first and said second coolant ejection means.

9. A thermal-attitude control system for a hypersonic vehicle having a low-drag nose configuration comprising in combination;
   (a) first coolant ejecting means for ejecting coolant fluid mounted at the apex of said low-drag configuration,
   (b) a second coolant ejection means for ejecting coolant fluid disposed about said nose periphery and comprising a permeable sectionalized structure,
   (c) conduit means disposed and mounted in said vehicle connecting said first and said second ejecting means with a regulating valve means and a control direction nozzle with said regulating valve means,
   (d) said nozzle pivotally mounted in said vehicle adjacent said permeable structure,
   (e) control means connected with said regulating valve means for activating said regulating valve means to eject said coolant through said conduit means at required quantity,
   (f) said control means connected with said direction nozzle for positioning direction of said nozzle and said nozzle arranged to blow said coolant fluid through said sectionalized permeable structure at a direction controlled by said control means for unequal ejected distribution of said coolant fluid through said sectionalized permeable structure thereby producing instantaneous sideloads for maneuvering of said vehicle.

10. The thermal-attitude control system as claimed in claim 9 wherein said control means comprises a computer means, a programmer means, an angle-of-attack sensor means and gyro means interconnected by electrical circuit means, and wherein temperature sensor means disposed at said vehicle skin periphery are connected with said electrical circuit means to said computer means.

References Cited

UNITED STATES PATENTS

| 2,468,820 | 5/1949 | Goddard | 102—92.5 |
| 3,128,964 | 4/1964 | LeBel | 244—1 |
| 3,267,857 | 8/1966 | Lindberg | 102—92.5 |

FOREIGN PATENTS 1,380,992  10/1964  France.

FERGUS S. MIDDLETON, *Primary Examiner.*